Figure 1:
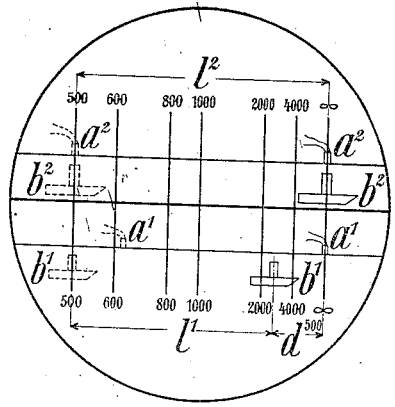

UNITED STATES PATENT OFFICE.

OTTO EPPENSTEIN, OF JENA, GERMANY, ASSIGNOR TO THE FIRM OF CARL ZEISS, OF JENA, GERMANY.

COINCIDENCE-TELEMETER.

940,137.   Specification of Letters Patent.   Patented Nov. 16, 1909.

Application filed January 4, 1909. Serial No. 470,595.

*To all whom it may concern:*

Be it known that I, OTTO EPPENSTEIN, a citizen of the German Empire, and residing at Carl-Zeiss strasse, Jena, in the Grand Duchy of Saxe-Weimar, Germany, have invented a new and useful Coincidence-Telemeter, of which the following is a specification.

The invention consists in an improvement in coincidence telemeters in the more comprehensive sense of the word. To these instruments belong all those monocular telemeters, of whose two image fields at least one extends in the direction of the base line through the whole field of the ocular, and whose two images can be shifted relatively to one another in the direction of the base line, in order that the difference in position of the two image points corresponding to an object point can be set to zero in the direction of the base line, that is to say, coincidence for these two points can be produced, either in the literal or in the metaphorical sense. In some telemeters of this kind, as is well known, the two image fields are superimposed, while in others they are separated. Ordinarily the images are both completely erected, though arrangements also are known in which one image is inverted in the direction at right angles to the base line.

The object of the invention is to render measurement with the above telemeters about as simple as with the stereoscopic telemeter with a fixed scale. In the latter instrument there is no need for manipulating a setting device of any kind whatever in taking measurement, and reading off the said fixed scale follows the observation immediately, since this scale is arranged in the field of view of the telescope.

A new coincidence telemeter, which requires no micrometrical setting device and permits the distance of the observed object point being read off on a fixed scale in the field of the ocular, can be based on the well known coincidence telemeter in the following manner. Through dispensing with the micrometrical setting device the problem in the first place arises how to evolve another means for effecting coincidence. Now the two images become capable of being shifted relatively to one another in the direction of the base line in a very simple manner—the difference in position of the two image points relatively to the direction of the base line, which image points correspond to the object point under observation, can consequently be nullified—if the two images be given different magnifications, at least in the direction of the base line. If the instrument equipped in this manner be rotated in the sighting plane, both images move through the ocular field in the direction of the base line, but with different velocities according to their magnifications. If the rotation of the instrument be given such a signification as to direction, that the image point in the less magnified image leads the way, the image point in the more magnified image will catch up to it at a certain definite place of the ocular field. At this place, more exactly expressed in the straight line drawn at right angles to the base line and including the two image points, coincidence of the pairs of image points of all object points takes place, which have the same distance as the one under observation. To every other distance a different place of coincidence corresponds. From this fact a fixed scale of the distances with strokes at right angles to the base line may be drawn within the field of the ocular. Since the length of the scale can be no longer than the diameter of the ocular field, under certain circumstances the accuracy of the reading or the range of measurement may be too small. This drawback is obviated by dividing one of the two image fields into two parts, which follow one another in the direction at right angles to the base line, either immediately, in the case of the superimposed image fields, or, in the case of the separated ones, in such a manner that the two parts are on either side of the undivided image field. Two scales can then be employed, since the image points of each one of the two image parts come into coincidence with the corresponding image points of the undivided image. In order that, however, either scale may form a supplement to or extension of the other, the two image parts as to their arrangement must suitably differ from one another. There can be, for instance, a mere difference in position, the instrument being so adjusted that the two image parts are displaced relatively to each other in the direction of the base line. In that case the two scales have the same direction. A difference in magnification between both image parts may be also serviceable. One image part must have a stronger and the other a weaker magnification than the undivided image. The scales then have opposite direction.

Figure 2:
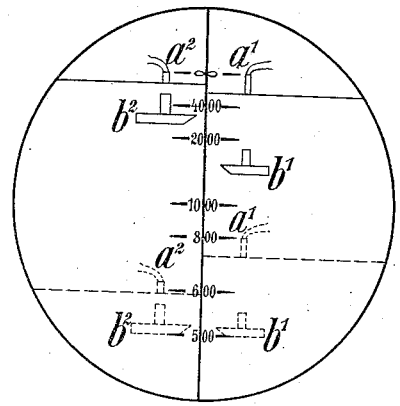
Figure 3:
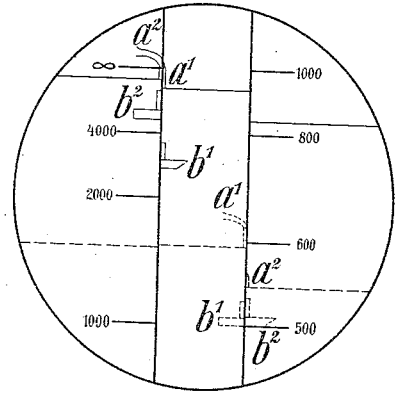
Figure 4:
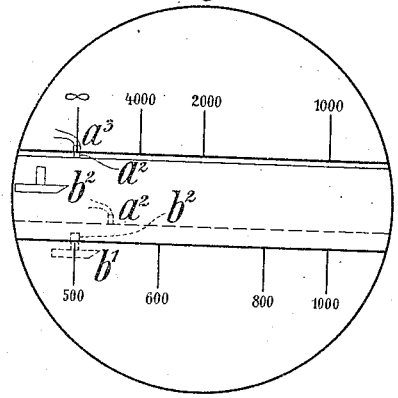
Figure 5:
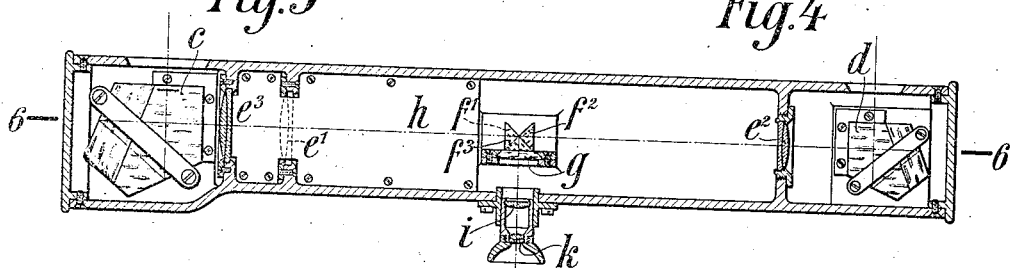
Figure 6:
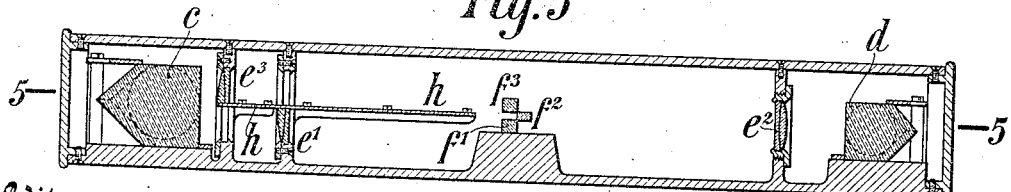

In the annexed drawing: Figure 1 is the ocular field of a telemeter with horizontal base line constructed according to the invention. Fig. 2 is the ocular field of a telemeter with vertical base line. Fig. 3 is the ocular field of a second telemeter with vertical base line. Fig. 4 is the ocular field of a second telemeter with horizontal base line. Fig. 5 is a sectional plan view of a telemeter, the ocular field of which corresponds to Fig. 4. Fig. 6 is a vertical section on line 6—6 of Fig. 5.

As to the ocular field shown in Fig. 1, its lower half (the lower image field) contains the image of lesser magnification projected by the right telescope objective with shorter focal length and the upper image field contains the image of greater magnification projected by the left telescope objective with longer focal length. In order to more clearly illustrate the case the telemeter is adjusted in the unusual manner in which the two images do not have the same common level but a difference in height by means of which the same objects are visible in both images. The funnel $a^1$, $a^2$ of a steamer at an "infinite" distance is visible above the horizon of the water, besides which there is also a steamship $b^1$, $b^2$ at a distance of 500 meters. The instrument is directed, so that the images $a^1$ and $a^2$ of the object at an infinite distance coincide with their center lines in the $\infty$ stroke of the scale. As it happens, the object $b^1$, $b^2$ occupies such a position on the water, that the vertical plane, which corresponds in the object space to the $\infty$ stroke of the image field of the left telescope, also passes through the center line of this object. Hence in the upper image field the center line of $b^2$ also coincides with the $\infty$ stroke. Whereas in the lower image field, which belongs to the right telescope, the center line of $b^1$ is displaced by the distance $d^{500}$ to the left of the $\infty$ stroke. Now if the instrument be rotated in the sighting plane to the right, both images pass through the ocular field to the left. After $b^2$ has thus crossed the distance $l^2$, it "coincides" with $b^1$; both center lines lie in the same perpendicular to the base line, which is represented by the stroke 500 of the scale. The distance $l^1$ crossed by $b^1$ is shorter in length by $d^{500}$ than $l^2$. Since the length $d^{500}$ is the same as in the usual telemeters having in both image fields the magnification which here exists in the lower one, and since, moreover, the lengths $l^2$ and $l^1$ are in the same proportion as the magnifications of the upper and lower image, the distance $l^2$ between the stroke 500 and the $\infty$ stroke can be easily calculated.

In the instrument the ocular field of which is shown in Fig. 2 the image of the upper telescope has the smaller magnification. It is received in the right image field, being supposedly reversed in the horizontal direction. This reversal has many advantages with regard to the form of the scale here chosen. The objects shown are the same as in example Fig. 1. The operation is analogous to that of the instrument shown in Fig. 1, the base line and the sighting plane, while horizontal in the former case, being here vertical. Also by means of dots a second position of the instrument is indicated, which is attained, in measuring the distance of the object $b^1$, $b^2$, by a rotation of the instrument in the sighting plane, whereby the images are caused to sink down through the ocular field.

In Fig. 3 the middle image field contains the image of the upper telescope, which, at the same time, is also that of the lesser magnification. The second image, appertaining to the lower telescope and of greater magnification, is visible in the two lateral parts of the ocular field. By means of adjustment, both lateral image parts are displaced relatively to one another in a vertical direction, so that the lower end of the left scale has the same value as the upper end of the right one. The range of measurement is not larger than in Figs. 1 and 2, but is divided between both scales, since the difference between the two magnifications is about half as large as in those two examples. The images are both completely erected. The instrument is adjusted, so that in measuring coincidence (in the literal meaning of the word) of the image points takes place. The transfer from one scale to the other requires a lateral rotation of the instrument.

In the ocular field according to Fig. 4 the image of the right telescope occupies the middle image field. The image of the left telescope is visible in the upper and lower image fields. The upper image part has a lesser and the lower a greater magnification than the image in the middle image field. By this means the two scales have opposite direction. The funnel in the upper field, having the least magnification, is denoted by $a^3$.

In the instrument according to Figs. 5 and 6 the objectives are arranged behind the objective prisms $c$ and $d$, on the right a complete lens $e^2$, on the left two half lenses, $e^1$ below and $e^3$ above the axis of the instrument. The focal length of $e^3$ is greater and that of $e^1$ less than the focal length of $e^2$. The separating prism system consists of three prisms, of which the lower $f^1$ and the upper $f^3$ are thicker than the middle one $f^2$. The three prisms are cemented together and, by means of their back surfaces, also to a plano-parallel plate $g$. The two scales shown in Fig. 4 and the diaphragm of the ocular field, indicated by the boundary circle in the same figure, are arranged on the front surface of the plate $g$. Into the same surface the images projected by the objective lenses $c^1$, $c^2$ and $c^3$ are transferred by the separating prisms $f^1$, $f^2$ and $f^3$. A partition $h$ prevents the rays which have passed through $c^1$ intermingling with those which have passed through $c^3$, so that of the image of the left telescope the part with the greater magnification is seen in the upper, that with the lesser in the lower image field only. An ocular $i$ $k$ completes the optical equipment of the instrument.

I claim:

1. A telemeter consisting of two telescopes with one ocular, but each having a lens system which produces a real object image extending through the ocular field in the direction of the base line, one of the lens systems having a greater focal length than the other, and a scale system fixed in the ocular field with the strokes at right angles to the base line.

2. A telemeter consisting of two telescopes with one ocular, one telescope having a lens system which produces a real object image extending through the ocular field in the direction of the base line, the other telescope having two lens systems of different focal length, the focal length of one system being larger and the focal length of the other system smaller than that of the lens system of the first telescope and the partial real object images produced by the two lens systems of the second telescope extending side by side through the ocular field in the direction of the base line, and two supplementary scales of opposite direction fixed in the ocular field side by side with the strokes at right angles to the base line.

OTTO EPPENSTEIN.

Witnesses:
PAUL KRÜGER,
FRITZ SANDER.